United States Patent
Arnold et al.

(10) Patent No.: US 9,245,242 B2
(45) Date of Patent: Jan. 26, 2016

(54) AIRCRAFT STATUS TIMELINE

(75) Inventors: Ted Arnold, Highlands Ranch, CO (US); David Perez, Euless, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 2294 days.

(21) Appl. No.: 12/192,652

(22) Filed: Aug. 15, 2008

(65) Prior Publication Data

US 2010/0042268 A1    Feb. 18, 2010

(51) Int. Cl.
G01C 23/00 (2006.01)
G05D 1/00 (2006.01)
G06Q 10/06 (2012.01)
G06Q 50/30 (2012.01)

(52) U.S. Cl.
CPC ............ *G06Q 10/06* (2013.01); *G06Q 50/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,812,990 A * | 3/1989 | Adams et al. | | 701/3 |
| 4,975,696 A * | 12/1990 | Salter et al. | | 340/973 |
| 5,208,590 A * | 5/1993 | Pitts | | 340/973 |
| 6,134,500 A * | 10/2000 | Tang et al. | | 701/202 |
| 6,335,694 B1 * | 1/2002 | Beksa et al. | | 340/945 |
| 6,421,603 B1 * | 7/2002 | Pratt et al. | | 701/206 |
| 6,584,400 B2 * | 6/2003 | Beardsworth | | 701/120 |
| 6,661,353 B1 * | 12/2003 | Gopen | | 340/973 |
| 6,873,903 B2 * | 3/2005 | Baiada et al. | | 701/120 |
| 6,922,631 B1 * | 7/2005 | Dwyer et al. | | 701/206 |
| 7,006,903 B2 * | 2/2006 | Smith et al. | | 701/3 |
| 2002/0002548 A1 * | 1/2002 | Roundtree | | 707/1 |
| 2003/0233178 A1 | 12/2003 | Sinex | | |
| 2007/0150178 A1 | 6/2007 | Fortier | | |

FOREIGN PATENT DOCUMENTS

| | | |
|---|---|---|
| JP | 2001-206297 | 7/2001 |
| JP | 2008-068730 | 3/2008 |

OTHER PUBLICATIONS

Notification of Transmittal of the International Search Report and the Written Opinion of the International Searching Authority or the Declaration, dated Feb. 24, 2010 from counterpart PCT application Serial No. PCT/US2009/052680 filed Aug. 4, 2009 (4 pages).

Written Opinion of the International Searching Authority, dated dated Feb. 24, 2010 from counterpart PCT application Serial No. PCT/US2009/052680 filed Aug. 4, 2009 (4 pages).

International Search Report, dated Feb. 24, 2010 from counterpart PCT application Serial No. PCT/US2009/052680 filed Aug. 4, 2009 (3 pages).

* cited by examiner

*Primary Examiner* — Bhavesh V Amin
(74) *Attorney, Agent, or Firm* — Hewlett Packard Enterprise Patent Department

(57) ABSTRACT

An apparatus, and an associated method, provides a visualization of an aircraft status relative to a scheduled airline timeline for the aircraft. Input information associated with the aircraft and operations associated therewith, are provided and detected. The input information is used to generate a timeline having one or more milestones and an aircraft icon. The timeline and the aircraft icon are together displayed by a displayer. The visualization is viewable by airline personnel, permitting their viewing of the visualization.

20 Claims, 4 Drawing Sheets

AIRCRAFT STATUS TIMELINE

The present invention relates generally to a manner by which to facilitate analysis of activities related to an aircraft, at any time between flight inception, the actual flight, and post-flight maintenance. More particularly, the present invention relates to an apparatus, and an associated method, by which to present a visual presentation that identifies the aircraft at an aircraft choreography timeline.

The visual presentation provides ready indication of the status of the aircraft relative to milestones along the timeline. Personnel are better able to take corrective action as a single, comprehensive view permits operating personnel quickly to visualize aircraft status, thereby facilitating the analysis.

BACKGROUND OF THE INVENTION

The airline industry is a labor-intensive industry, requiring large numbers of operational personnel at multiple airports, and other, facilities, working in all aspects of aircraft operations relating to flight, maintenance, and other support activities. Additionally, logistical challenges associated with operational aspects of large numbers of aircraft and ensuring that appropriate levels of staffing are in place so that the airline operations can best be effectuated.

Many activities must be performed, and many factors must be taken into account for each aircraft throughout a typical day, or other time period. Activities are required to be undertaken and carried out at different locations and at different times, all dependent upon the location of the aircraft, or where the aircraft is scheduled to be at some future point, or where the aircraft has previously been positioned. Any disruption in a set schedule or routine interferes with timeliness of operation of the affected aircraft. And, when disruptions to the set schedules or routines of a plurality of aircraft occur, such disruptions interfere with the timeliness of operations of the affected aircraft. Generally, the sooner that the disruption is detected and alerted, and its cause determined, the sooner that ameliorative action can be undertaken and the affects of the disruption can be minimized. And, in some situations, ameliorative action can be taken on a prospective basis, sometimes even to prevent the occurrence of the disruption or limit its effects.

In order to take corrective action to ameliorate a schedule disruption typically requires that information relating to many aspects of the aircraft operations be monitored so that the disruption is early-identified. As airline operations are distributed across many locations, even across multiple continents, monitoring aircraft operations, even for a single aircraft, typically requires monitoring of information generated at multiple locations. And, when monitoring of a large number of aircraft is performed, such monitoring must be undertaken across a large number of locations.

Personnel of the airlines regularly, pursuant to their regular job activities, provide information related to different aspects of the aircraft operations. For instance, weight information associated with baggage that is to be loaded onto the aircraft as well as weight information associated with passengers that are to embark on a flight of the aircraft are provided and input into a computer system by ground personnel. The weight information is used, e.g., to perform balance and other calculations. Passenger weight information is, e.g., obtained from a passenger count. And, the baggage and passenger-count information is usable for forecasting, as well as from a weight and balance prospective. Fuel information is also provided by airline personnel and is used, amongst other things, pursuant to weight, cost, and distribution considerations. Weather information is also provided, both by airline personnel as well as by governmental, and other, weather-reporting entities. Weather information is provided for multiple locations, a take-off location and one or more landing-locations, as well as end-route conditions. Information relating to aircraft flight plans, and other related filings are also provided by airline personnel, both those required for airline and air flight operations as well as those required for governmental agencies. Significant additional aircraft-related, airport-related information, maintenance, and other information is provided and used by airline personnel.

While large amounts of information is collected by, or otherwise used by airline personnel, the information is generally obtained and used by other airline personnel that share a common task or mission. Collected, or otherwise entered, information is not always easily obtainable by any airline personnel that might need access to the information, nor is the information generally presentable in a manner that provides a comprehensive view of actual aircraft conditions and status relative to a scheduled choreography.

If a manner could be provided by which to provide a comprehensive view of the aircraft relative to an aircraft choreography, airline personnel would more easily be able to identify anomaly situations and more quickly be able to take ameliorative or preventive measures.

It is in light of this background information related to airline operations that the significant improvements of the present invention have evolved.

SUMMARY OF THE INVENTION

The present invention, accordingly, advantageously provides an apparatus, and an associated method, by which to facilitate analysis of activities related to an aircraft. The activities extend at any time between flight inception, the actual flight, and the post-flight maintenance of the aircraft.

Through operation of an embodiment of the present invention, a manner is provided by which to present a visual presentation that identifies the aircraft at an aircraft choreography timeline.

In one aspect of the present invention, the visual presentation provides a ready indication of the status of the aircraft. The presentation positions the aircraft relative to milestones along a choreography timeline. Personnel are better able to take corrective action as a single, comprehensive view permits operating personnel to ascertain aircraft status by viewing the visual presentation. Quicker actions can be taken to ameliorate, or prevent, anomalies to the normal schedule of the aircraft.

In another aspect of the present invention, the visual presentation is provided upon a display screen, viewable by airline personnel, and others, quickly identify the status of the aircraft relative to the timeline milestones. Multiple display screens, e.g., are provided at disparate airline locations at each of which the visual presentation is provided. The aircraft status is thereby readily ascertainable by personnel at all of the disparate locations merely by viewing the visual presentation.

In another aspect of the present invention, input information is provided. The input information is provided by airline personnel or from others, such as governmental or other, enterprises. The input information relates to any aircraft-related information and is detected by a detector that monitors for the aircraft information.

In another aspect of the present invention, the input information is provided in the form of messages, such as messages generated pursuant to execution of a flight-operations system.

Alternately, the input information is provided directly by way of input from the airline, or other, personnel or entities. When directly entered, the input information originates by way of personnel, or entities, positioned at any of various disparate locations. And, when the input information is provided as messages generated by a flight operations system, the messages are generated at the location, or locations, at which the flight operations system is embodied.

In another aspect of the present invention, the input information comprises flight-planning information, aircraft-movement information, load-planning information, and ACARS (aircraft communication addressing and reporting system) information. Collectively, the input information pertains to all aspects of the aircraft choreography throughout an aircraft timeline, howsoever defined.

In another aspect of the present invention, historical information is also provided as input information. The historical information is stored, or otherwise cached at a memory element. The historical information includes prior-detected data of aircraft operations, e.g., on prior dates, averages relating to prior aircraft, timeline-related activities, etc.

In another aspect of the present invention, the visual presentation forms a life of a flight (LOF) display that time-lines all aircraft-related activities of an aircraft during a period defined by the timeline. The visual presentation includes, e.g., an icon-like representation of the aircraft together with identifying information, such as flight number, or numbers, aircraft number identification, etc.

In another aspect of the present invention, the visual presentation includes the timeline that is plotted in terms of any time-based quantity. The timeline, forming an aircraft choreography timeline, includes one or more choreography milestones identified by the airline or otherwise of significance to the status of the aircraft. Each milestone forms a marker against which the status of the aircraft is measured. If the status of the aircraft indicates that a milestone might not be timely achieved, operating personnel are able to take action to ameliorate the problem or prevent its occurrence. Because the visual presentation presents the status of the aircraft along the timeline to permit its status quickly to be determined, operating personnel are quickly alerted to disruptions that interfere with the timeliness of the aircraft with respect to its schedule.

Information related to multiple aircraft is provided in a typical, airline operation that deploys a large number of aircraft. A timeline having one or more milestones is formed for each aircraft, and a representation of the aircraft is displayable together with the associated timeline. Operating personnel are able to select any particular aircraft, identified by its aircraft identification or flight number or other identifier, and cause the associated visual presentation to be displayed upon a display device.

In these and other aspects, therefore, an apparatus, and an associated methodology, is provided for presenting a user-viewable visualization of an aircraft choreography timeline of an aircraft. A timeline generator is configured to generate the aircraft choreography timeline. The aircraft choreography timeline includes at least one choreography milestone. An aircraft information detector is configured to detect information related to the aircraft. A displayer is configured to display a representation of the aircraft relative to the aircraft choreography timeline, at a location thereon responsive to the information detected by the aircraft information detector.

A more complete appreciation of the scope of the present invention and the manner in which it achieves the above-noted and other improvements can be obtained by reference to the following detailed description of presently-preferred embodiments taken in connection with the accompanying drawings that are briefly summarized below, and by reference to the appended claims.

DETAILED DESCRIPTION

Figure 1:
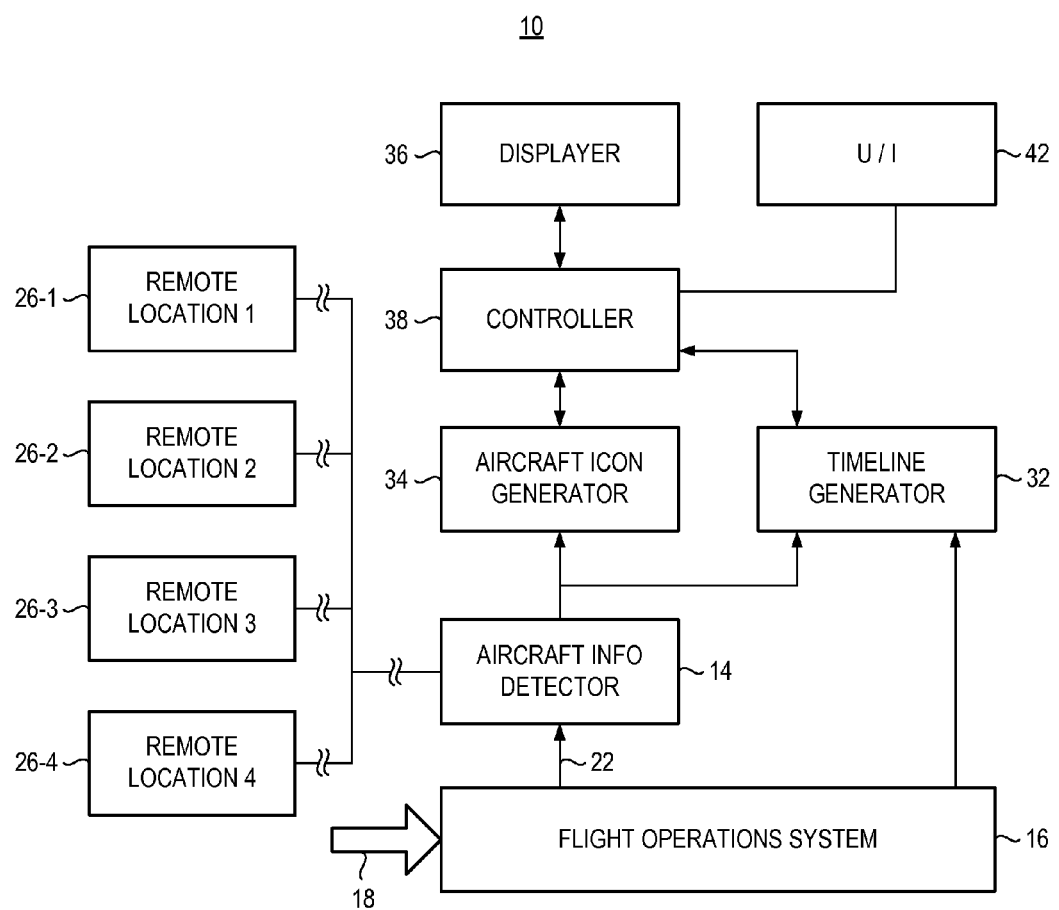
FIG. 1 illustrates a functional block diagram of an embodiment of the present invention.

Referring first to FIG. 1, an apparatus, shown generally at 10, facilitates presentation of a user-viewable visualization of an aircraft choreography timeline of an aircraft, such as an aircraft of a commercial, or other, airline. The elements of the apparatus 10 are functionally represented, implementable in any desired manner, including, e.g., by algorithms executable by processing circuitry, hardware implementations, and combinations thereof. Additionally, while the elements of the apparatus are shown together at a common physical location, in other implementations, the elements of the apparatus are distributed at more than one physical location.

The apparatus 10 includes an aircraft information detector 14 that detects aircraft-related information provided, in various implementations, by any of various information sources. The information is provided, e.g., by other airline, flight-operations control apparatus, here represented as a service oriented architecture system. Input information is provided to the flight operations system by airline personnel and other entities. The input information is represented to be provided to the flight operations system by way of the lines 18. And, in this implementation, the flight operations system generates messages that include aircraft-related information and that are provided to the aircraft information detector 14, here represented by way of the line 22. Alternately, or additionally, the aircraft information detector directly receives input information provided by aircraft personnel, and other entities, here indicated to be sourced at a plurality of remote locations 26. Certain of the detected information detected by the detector 14 is provided to a timeline generator 32, and information is also provided to an aircraft icon generator 34.

The timeline generator 32 operates to generate an aircraft timeline of an associated aircraft. When separate visual presentations are to be created for a plurality of different aircraft, the timeline generator operates to generate separate timelines for each of the aircraft.

The aircraft icon generator 34 operates to generate an aircraft icon that identifies an aircraft and its status. The aircraft icon, in the exemplary implementation, comprises an image of an aircraft together with identifying information, such as an aircraft tail number, aircraft flight number, or numbers, airline identification of the aircraft, etc. When multiple separate visualizations are to be provided for a plurality of aircraft, the aircraft icon generator generates a corresponding plurality of different aircraft icons.

A timeline generated by the time generator 32 and the aircraft icon generated by the aircraft icon generator 34 are provided to a displayer 36. The displayer operates to display the generated timeline together with the associated aircraft icon. The displayer operates to display the icon together with the timeline. The icon is, e.g., overlaid upon the timeline or otherwise presented to identify the status of the aircraft relative to its associated timeline. The displayer, e.g., includes or is formed of a video display, such as a liquid crystal display, CRT, or the like. The displayer is controlled by a controller 38 that also controls various operations of the detector 14, timeline generator 32, and aircraft icon generator 34. The controller is also coupled to receive inputs generated by a user interface (U/I) input device 42 that permits personnel to enter display instructions, such as instructions to display a timeline and aircraft, together forming an aircraft choreography timeline, of an aircraft. Operating personnel that operate the user interface input device 42 input, e.g., instruction for the displayer to display the aircraft choreography timeline of a particular aircraft, or to change the timeline that is currently displayed by the displayer.

The input information, here indicated to be sourced at remote locations 26, either directly to the detector 14 or to the flight operations system 16, is of any of various types. The remote location 26-1 is representative of a location at which flight-planning information is sourced. The location 26-2 is representative of a location at which aircraft-movement information is sourced. The location 26-3 is representative of a location at which load-planning information is sourced. And, the remote location 26-4 is representative of a location at which ACARS information is sourced. Additional, and other, types of information are analogously sourced and provided to the detector 14, either directly or by way of the system 16. When provided to the system 16 and messages are formed by the system 16 and provided to the detector 14, the messages are aggregated in a standardized way, and the detector operates to monitor for their delivery to the detector.

By providing the aircraft choreography timeline, a viewer is able quickly to determine whether the status of the aircraft differs with a planned status. If the visualization indicates a disruption, or other alteration in the aircraft status relative to its associated timeline.

In one implementation, the timeline generator uses input information provided by the detector 14 pursuant to identification of one or more milestones that are displayed along the generated timeline. A milestone comprises any of various milestones associated with the aircraft.

Figure 2:
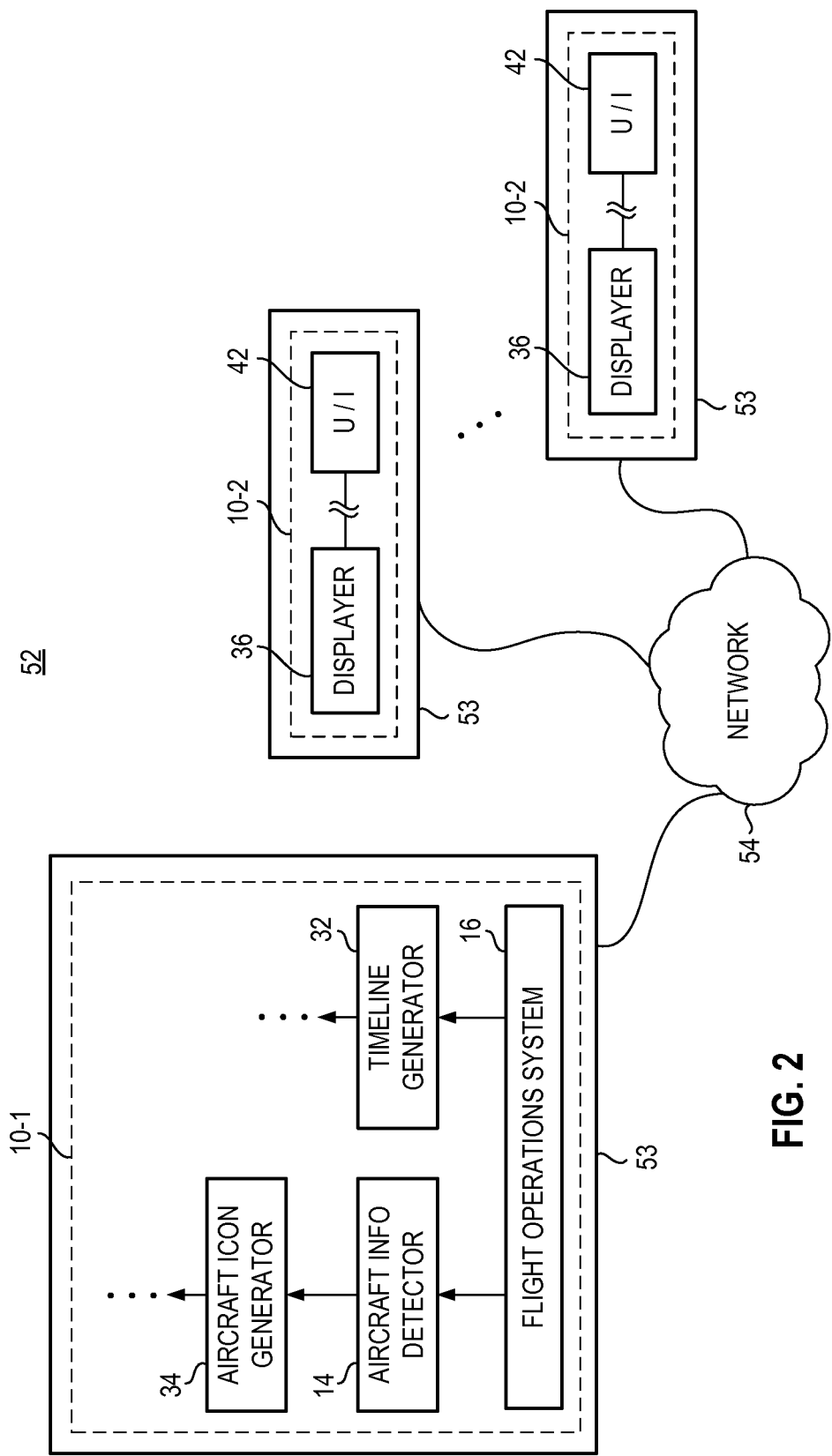
FIG. 2 illustrates a functional block diagram of a communication network in which an embodiment of the present invention is deployed.

FIG. 2 illustrates a network 52 having a plurality of network locations 53 placed in communication connectivity by way of a network 54, such as a private network or a public network, e.g., the internet. Portions of the apparatus 10, shown in FIG. 1, are embodied at different ones of the interconnected locations. Here, a portion 10-1 is embodied at a first location and includes flight operations system 16, an aircraft information detector 14, a timeline generator 32, and an aircraft icon generator 34. Each of the locations 10-2 includes a displayer 36, at least part of a controller 38, and a user interface input element 42. In the embodiment shown in FIG. 2, information obtained or detected at the location 10-1 is used to generate the aircraft icon and timeline that is displayable at any of the displayers 10-2. Personnel located in proximity to a displayer 36 of the portions 10-2 are able to view a visualization of the aircraft choreography timeline even when positioned remote from the other portions of the apparatus 10 by way of communication connectivity with the portion 10-1. Different visualizations are displayable at different displayers through appropriate request by personnel by way of the user interface input elements 42. By viewing the visualization of the choreography timeline, early notice is able to be made of aberrations of the status of the aircraft relative to its schedule. Corrective or preventive actions are thereby also able to be earlier made.

Figure 3:
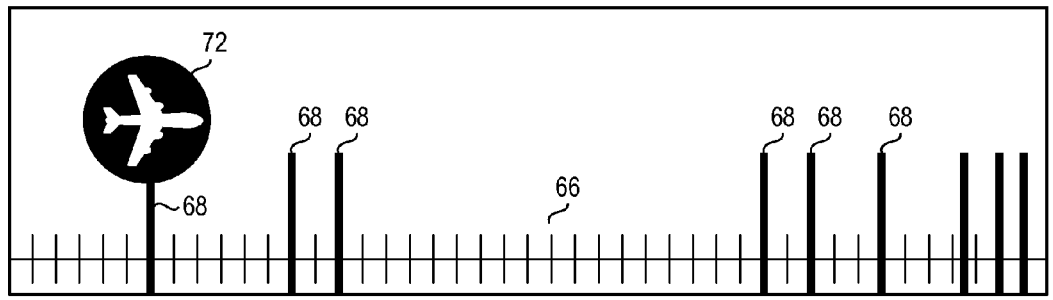
FIG. 3 illustrates an exemplary display generated pursuant to operation of an embodiment of the present invention.

FIG. 3 illustrates a representation, shown generally at 62 of an exemplary visualization generated pursuant to operation of an embodiment of the present invention. Here, the representation includes a timeline 66, here having a plurality of milestones 68. An icon 72 an aircraft is also displayed, associated with its timeline 66. Aircraft identification, such as the tail number of the aircraft, or the like, is included together with the icon. Here, for purposes of example, the aircraft is positioned in a timeline extending to aircraft takeoff. The milestones 68 are milestones associated with the particular aircraft 72.

Figure 4:
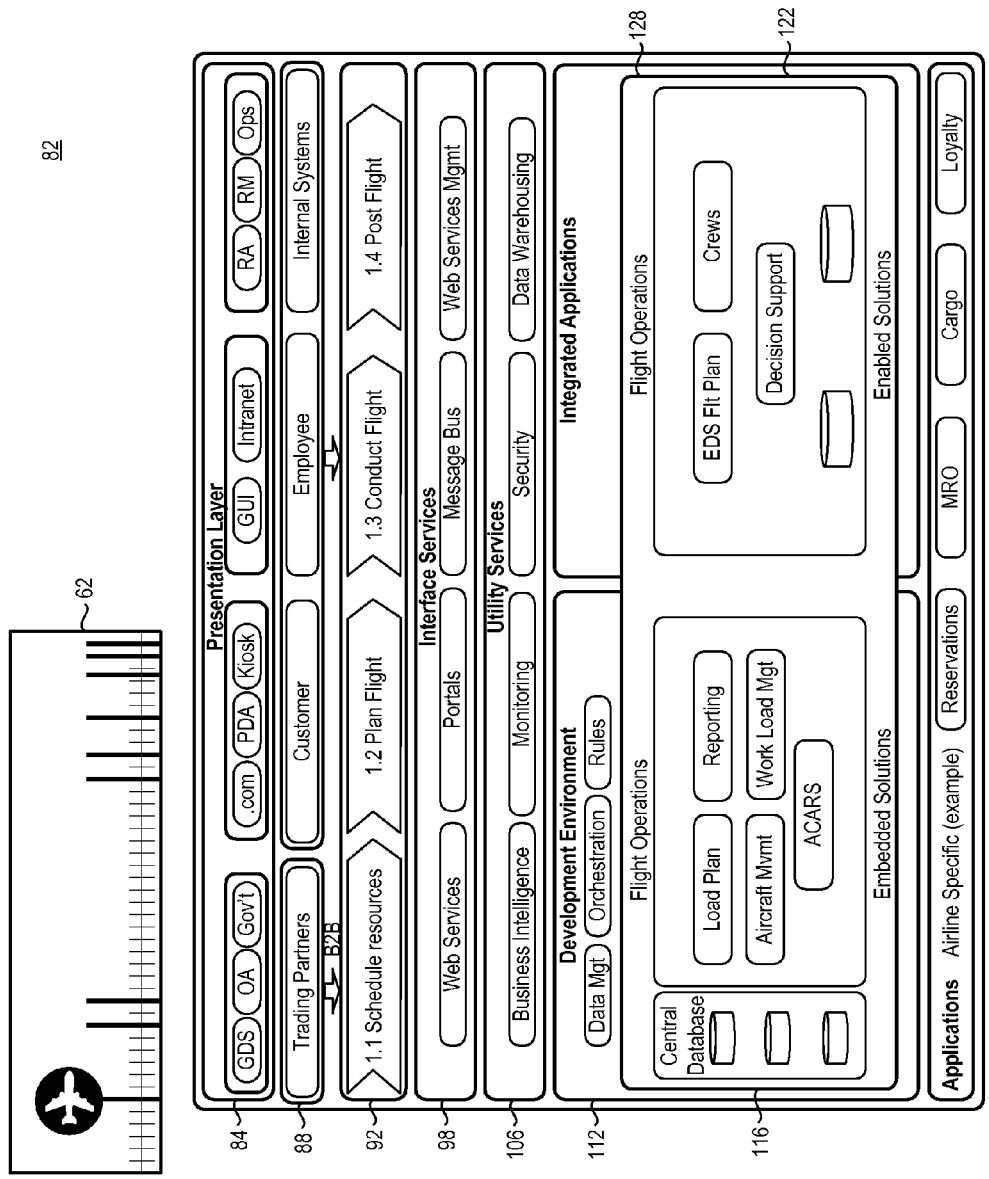
FIG. 4 illustrates a functional block diagram showing an exemplary implementation of an embodiment of the present invention together with a service oriented architecture infrastructure.

FIG. 4 illustrates a representation, shown generally at 82, of the exemplary, aircraft choreography timeline shown in FIG. 3 together with the architecture of a flight operations system 16. An application that implements the functionalities of portions of the apparatus 10 (shown in FIG. 1) is embodied at a presentation layer of the flight operations system. That is to say the application sits at the presentation layer 84. Entities that interface with the system 16 are represented at 88, here including trading partners, customers, employees, and internal systems. Operations associated with the system are shown at 92 including, scheduling of resources, flight planning, conducting of a flight, and post flight operations. Interface services are shown at 98. The interface services include web services, portals, message bus services, and web services management. Utility services are indicated at 106 and include business intelligence, monitoring, security, and data warehousing services. A development environment 112 identifies data management, orchestration, and rules. And, embedded solutions and enabled solutions 116 and 122 are further represented. And, specific applications 128 are further shown.

Messages generated during operation of the flight operations system are used to form the aircraft choreography timeline.

Figure 5:
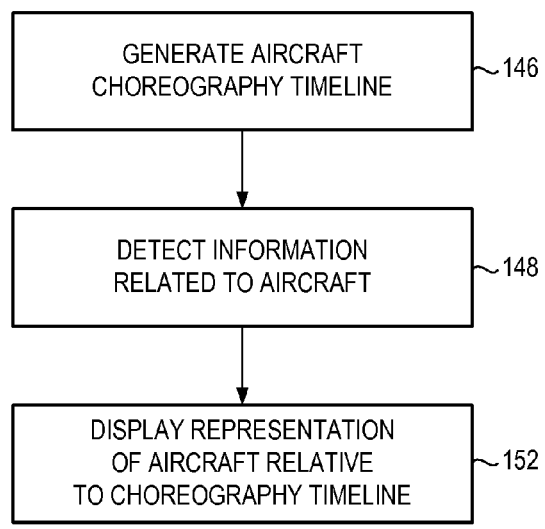
FIG. 5 illustrates a method flow diagram representative of the method of operation of an embodiment of the present invention.

FIG. 5 illustrates a method, shown generally at 142, representative of the method of operation of an embodiment of the present invention. The method facilitates presentation of a user-viewable visualization of an aircraft choreography timeline of an aircraft.

First, and as indicated at 146, an aircraft choreography timeline is generated that includes at least one choreography milestone. Then, and as indicated by the block 148, information related to the aircraft is detected.

Then, and as indicated by the block 152, a representation of the aircraft relative to the aircraft choreography timeline is displayed at a location along the timeline responsive to the information that is detected.

Thereby, a visualization is provided that permits personnel quickly to determine the status of an aircraft relative to its associated timeline.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. An apparatus for presenting a user-viewable visualization of an aircraft choreography of an aircraft, said apparatus comprising:

a timeline generator configured to generate the aircraft choreography timeline, the aircraft choreography timeline including at least one choreography milestone;

an aircraft information detector configured to detect information related to the aircraft; and a displayer configured to display a representation of the aircraft relative to the aircraft choreography timeline, at a location therealong responsive to the information detected by said aircraft information detector.

2. The apparatus of claim 1 wherein the aircraft choreography timeline includes a plurality of choreography milestones.

3. The apparatus of claim 1 wherein the at least one choreography milestone includes an aircraft flight related milestone.

4. The apparatus of claim 1 wherein the at least one choreography milestone includes a flight planning related milestone.

5. The apparatus of claim 1 wherein the at least one choreography milestone includes an aircraft movement related milestone.

6. The apparatus of claim 1 wherein the at least one choreography milestone comprises an aircraft load planning related milestone.

7. The apparatus of claim 1 wherein the at least one choreography milestone includes an ACARS, Aircraft Communication Addressing and Reporting System, related milestone.

8. The apparatus of claim 1 wherein said aircraft information detector is configured to detect historical information associated with the aircraft.

9. The apparatus of claim 8 wherein said apparatus further includes a memory element configured to store the historical information, said aircraft information detector configured to access said memory element.

10. The apparatus of claim 1 wherein said aircraft information detector is configured to detect aircraft flight related information.

11. The apparatus of claim 1 wherein said aircraft information detector is configured to detect flight planning related information.

12. The apparatus of claim 1 wherein said aircraft information detector is configured to detect ACARS, Aircraft Communication Addressing And Reporting System, information.

13. The apparatus of claim 1 wherein said displayer comprises a plurality of disparately positioned video displays, each configured to display the representation of the aircraft relative to the aircraft choreography timeline.

14. The apparatus of claim 1 wherein the representation of the aircraft displayed by said displayer includes an aircraft icon and aircraft identification, said aircraft choreography timeline including and extending between a flight buildup and nonflight maintenance.

15. A method for presenting a user-viewable visualization of an aircraft choreography timeline of an aircraft, said method comprising:

generating the aircraft choreography timeline that includes at least one choreography milestone;

detecting information related to the aircraft; and displaying a representation of the aircraft relative to the aircraft choreography timeline at a location therealong responsive to the information detected during said detecting.

16. The method of claim 15 wherein said displaying includes updating the representation of the aircraft relative to the aircraft choreography responsive to updated information detected during said detecting.

17. The method of claim 15 wherein said detecting and said displaying are iteratively performed.

18. The method of claim 15 wherein said displaying includes displaying the representation of the aircraft relative to the aircraft choreography timeline at a plurality of display devices.

19. The method of claim 15 wherein said detecting includes detecting information containing messages, said aircraft choreography timeline including and extending between a flight buildup and nonflight maintenance.

20. A method for tracking an aircraft during a period extending between and including flight buildup and nonflight maintenance, said method comprising:

monitoring aircraft related messages;

reacting to the aircraft related messages monitored during said monitoring; and displaying, at any of a plurality of displays, a representation of the aircraft relative to an aircraft choreography timeline extending between and including the flight buildup and the nonflight maintenance.

* * * * *